US010027233B2

(12) United States Patent
Somarowthu et al.

(10) Patent No.: US 10,027,233 B2
(45) Date of Patent: Jul. 17, 2018

(54) ISOLATED SINGLE-ENDED PRIMARY INDUCTOR CONVERTER WITH VOLTAGE CLAMP CIRCUIT

(71) Applicant: HONEYWELL INTERNATIONAL INC., Morris Plains, NJ (US)

(72) Inventors: Pandu Ranga Rao Somarowthu, Karnataka (IN); Sunit Kumar Saxena, Karnataka (IN); Deepak Bhimrao Mahajan, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/356,823

(22) Filed: Nov. 21, 2016

(65) Prior Publication Data
US 2018/0145599 A1 May 24, 2018

(51) Int. Cl.
*H02M 3/335* (2006.01)
*H02M 1/42* (2007.01)
(Continued)

(52) U.S. Cl.
CPC ......... *H02M 3/33546* (2013.01); *H02M 1/08* (2013.01); *H02M 1/42* (2013.01); *H02M 2001/0054* (2013.01)

(58) Field of Classification Search
CPC ...... H02M 3/33546; H02M 1/08; H02M 1/42; H02M 2001/0054
See application file for complete search history.

(56) References Cited

U.S. PATENT DOCUMENTS 5,442,534 A * 8/1995 Cuk ...................... H02M 3/005
363/16
5,583,421 A * 12/1996 Barbehenn ............ H02M 3/005
323/222
(Continued)

FOREIGN PATENT DOCUMENTS

CN 203261235 U 10/2013

OTHER PUBLICATIONS

Kshemada Devi V, et al.; A Closed Loop Model of Modified SEPIC Converter with Magnetic Coupling and Output Diode Voltage Clamping; International Journal of Advanced Research in Electrical,Electronics and Instrumentation Engineering; vol. 4, Issue 9, Sep. 2015.
(Continued)

*Primary Examiner* — Jue Zhang
*Assistant Examiner* — Lakaisha Jackson
(74) *Attorney, Agent, or Firm* — Lorenz & Kopf, LLP (57) ABSTRACT

A single-ended primary-inductor converter (SEPIC) circuit has at least a circuit input node and a circuit common node, and includes an inductor, a first coupling capacitor, an isolation transformer, a controllable switch, a second coupling capacitor, and a clamp diode. The inductor is electrically connected in series between the circuit input node and the first coupling capacitor. The first coupling capacitor is connected in series between the inductor and the first primary input terminal. The controllable switch is electrically connected in series between an internal circuit node and the circuit common node, and the internal circuit node is located between the inductor and the first coupling capacitor. The second coupling capacitor is electrically connected in series between the second primary input terminal and the circuit common node. The clamp diode is electrically con-
(Continued)

nected in series between the internal circuit node and the second primary input terminal.

20 Claims, 6 Drawing Sheets

(51) Int. Cl.
*H02M 1/08* (2006.01)
*H02M 1/00* (2006.01)

(56) References Cited

U.S. PATENT DOCUMENTS

| | | | |
|---|---|---|---|
| 5,736,842 A | 4/1998 | Jovanovic | |
| 6,008,589 A * | 12/1999 | Deng | H02M 1/425 |
| | | | 315/205 |
| 6,144,565 A * | 11/2000 | Lethellier | H02M 3/155 |
| | | | 323/222 |
| 6,259,235 B1 | 7/2001 | Fraidlin et al. | |
| 6,314,002 B1 | 11/2001 | Qian et al. | |
| 8,107,268 B2 | 1/2012 | Chung et al. | |
| 8,705,253 B2 | 4/2014 | Roman | |
| 2007/0138971 A1 | 6/2007 | Chen | |
| 2012/0314455 A1 | 12/2012 | Roman | |
| 2013/0242622 A1* | 9/2013 | Peng | H02M 3/33507 |
| | | | 363/21.12 |

OTHER PUBLICATIONS

A. Gopi, et al.; High step-up isolated efficient single switch DC-DC converter for renewable energy source; School of Electrical Engineering, VIT University, Vellore, India; Received Dec. 30, 2013; revised Apr. 19, 2014; accepted May 1, 2014; Available online Jun. 3, 2014.
Sam Ben-Yaakov, et al.; Passive Lossless Snubbers for High Frequency PWM Converters; Power Electronics Laboratory Department of Electrical and Computer Engineering Ben-Gurion University of the Negev; Mar. 1999.
Nigel Machin, et al.; New lossless clamp for single ended converters; IEEE Xplore, Conference Paper Nov. 1997.
P. Sivachandran, et al; Review on High Step up DC-DC Converter for High Voltage Gain; Middle-East Journal of Scientific Research 24 (3): 794-802, 2016 ISSN 1990-9233 © IDOSI Publications, 2016.
Reshma KR, et al; PWM Contol of High Gain Sepic Boost Converter With Coupled Inductor and Charge Pump Capacitor; International Research Journal of Engineering and Technology (IRJET) e-ISSN: 2395-0056 vol. 02 Issue: 09 | Dec. 2015.
Extended EP Search Report for Application No. 17201250.2 dated Apr. 6, 2018.
De Melo, P.F. et al.; "A Modified SEPIC Converter for High-Power-Factor Rectifier and Universal Input Voltage Applications," IEEE Transactions on Power Electronices, vol. 25, No. 2, Feb. 2010.
Erickson, Robert, et al. "Fundamentals of Power Electronics Second Edition," Kluwer Academic Publishers, Jan. 2007.

* cited by examiner

ISOLATED SINGLE-ENDED PRIMARY INDUCTOR CONVERTER WITH VOLTAGE CLAMP CIRCUIT

TECHNICAL FIELD

The present invention generally relates to power converter circuits, and more particularly relates to an isolated single-ended primary inductor converter (SEPIC) that includes an improved voltage clamp circuit.

BACKGROUND

In recent years, there has been an ever-increasing demand for power electronics to drive LED based lighting systems. Along with this is the demand for improving the power quality of the AC systems supplying the power electronics. Various options are available to improve the power quality of AC systems. One of the options that is gaining in popularity is the active shaping of the input line current (i.e., active Power Factor Correction (PFC)), since it makes the load appear as a pure resistance, leading to near unity load power factor and generating negligible harmonics in the input current.

One well-known active PFC LED driver is a single-ended primary inductor converter (SEPIC). This type of driver uses only one switch to harmonize the input current and to regulate the current through the LEDs. Even more preferable, is to use the SEPIC converter operating in discontinuous conduction mode (DCM). This is a cost effective and simple solution because operating in DCM allows the converter to operate as a voltage follower, where the input current naturally follows the input voltage profile without the use of an inner current control loop. Operating in DCM additionally reduces switching losses because switch turn-on occurs with zero current, and the output diode does not present reverse recovery current.

For potentially harsh environments, such as those encountered by aerospace exterior light systems, isolation of load from the input is desired from product reliability perspective. Thus, an isolated SEPIC is even more preferable for these types of environments. However, because of the insulation voltage requirements associated with such environments, close coupling between primary and secondary windings of the isolation transformer is not allowed. As a result, both the primary and secondary transformer windings exhibit considerable leakage inductances. This can lead to undesirably large voltage spikes during switching operations. These large voltage spikes can reduce overall circuit reliability, and can generate undesirable electromagnetic interference (EMI).

Hence, there is a need for an isolated SEPIC that does not generate undesirably large voltage spikes during switching operations and/or that provides improved circuit reliability and/or that does not generate undesirable electromagnetic interference (EMI). The present invention addresses at least these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a single-ended primary-inductor converter (SEPIC) circuit has at least a circuit input node and a circuit common node, and includes an inductor, a first coupling capacitor, an isolation transformer, a controllable switch, a second coupling capacitor, and a clamp diode. The isolation transformer has a transformer primary and a transformer secondary. The transformer primary has a first primary terminal and a second primary terminal, and the transformer secondary has a first secondary terminal and a second secondary terminal. The inductor is electrically connected in series between the circuit input node and the first coupling capacitor. The first coupling capacitor is connected in series between the inductor and the first primary input terminal. The controllable switch is electrically connected in series between an internal circuit node and the circuit common node, and the internal circuit node is located between the inductor and the first coupling capacitor. The second coupling capacitor is electrically connected in series between the second primary input terminal and the circuit common node. The clamp diode is electrically connected in series between the internal circuit node and the second primary input terminal.

In another embodiment, a single-ended primary-inductor converter (SEPIC) circuit has at least a circuit input node, a circuit common node, a first output node, and a second output node, and includes an inductor, a first coupling capacitor, an isolation transformer, a controllable solid-state switch, a second coupling capacitor, a clamp diode, and an output diode. The isolation transformer has a transformer primary and a transformer secondary. The transformer primary has a first primary terminal and a second primary terminal, and the transformer secondary has a first secondary terminal and a second secondary terminal. The inductor is electrically connected in series between the circuit input node and the first coupling capacitor. The first coupling capacitor is connected in series between the inductor and the first primary input terminal. The controllable solid-state switch is electrically connected in series between an internal circuit node and the circuit common node, where the internal circuit node is located between the inductor and the first coupling capacitor. The second coupling capacitor is electrically connected in series between the second primary input terminal and the circuit common node. The clamp diode is electrically connected in series between the internal circuit node and the second primary input terminal. The output diode is electrically connected between the first secondary terminal and the first output node. The second output node is electrically connected to the second secondary terminal.

In yet another embodiment, a single-ended primary-inductor converter (SEPIC) circuit has at least a circuit input node, a circuit common node, a first output node, and a second output node, and includes an inductor, a first coupling capacitor, an isolation transformer, a controllable solid-state switch, a second coupling capacitor, a clamp diode, an output diode, an output capacitor, and a string of light emitting diodes (LEDs). The transformer has a transformer primary and a transformer secondary. The transformer primary has a first primary terminal and a second primary terminal, and the transformer secondary has a first secondary terminal and a second secondary terminal. The inductor is electrically connected in series between the circuit input node and the first coupling capacitor. The first coupling capacitor is connected in series between the inductor and the first primary input terminal. The controllable solid-state switch is electrically connected in series between an internal circuit node and the circuit common node, where the internal circuit node is located between the inductor and the first coupling capacitor. The second coupling capacitor is electrically connected in series between the second primary input terminal and the circuit common node. The clamp diode is electrically connected in series between the internal circuit node and the second primary input terminal. The output diode is electrically connected between the first secondary terminal and the first output node. The output capacitor is electrically connected to the first output node, the second output node, and the second secondary terminal. The string of LEDs is electrically connected in parallel with the output capacitor.

Furthermore, other desirable features and characteristics of the isolated SEPIC will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
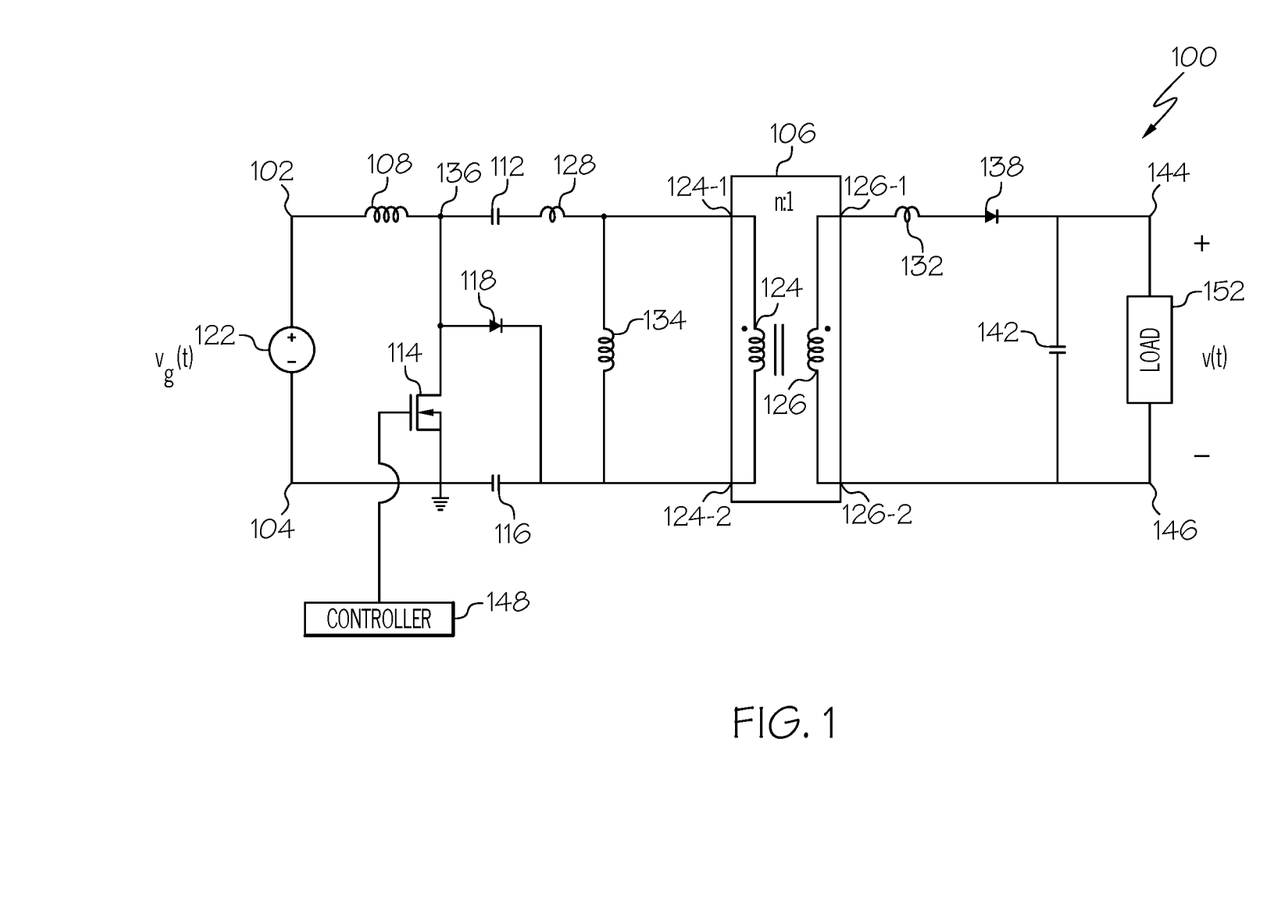
FIG. 1 depicts a schematic diagram of one embodiment of an isolated single-ended primary-inductor converter (SEPIC) circuit.

Referring now to FIG. 1, a schematic diagram of an isolated single-ended primary-inductor converter (SEPIC) circuit 100 is depicted. The depicted circuit 100 includes at least a circuit input node 102, a circuit common node 104, an isolation transformer 106, an inductor 108, a first coupling capacitor 112, a controllable switch 114, a second coupling capacitor 116, and a clamp diode 118. As FIG. 1 also depicts, the circuit 100 is configured to be energized from an electrical power source 122, such as a suitable DC power source, that is connected to the circuit input node 102 and the circuit common node 104.

The isolation transformer 106, as is generally known, includes a transformer primary 124 and a transformer secondary 126. The transformer primary 124 has a first primary terminal 124-1 and a second primary terminal 124-2, and the transformer secondary 126 has a first secondary terminal 126-1 and a second secondary terminal 126-2. The isolation transformer 106 additionally exhibits non-ideal inductances. These non-ideal inductances, which are also depicted in the circuit 100, include a primary leakage inductance 128, a secondary leakage inductance 132, and a magnetizing inductance 134.

Turning now to the remainder of the circuit, it is seen that the inductor 108 is electrically connected in series between the circuit input node 102 and the first coupling capacitor 112. The first coupling capacitor 112 is connected in series between the inductor 108 and the first primary input terminal 124-1. The controllable switch 114 is electrically connected in series between an internal circuit node 136, which is located between the inductor 108 and the first coupling capacitor 112, and the circuit common node 104. The second coupling capacitor 116 is electrically connected in series between the second primary input terminal 124-2 and the circuit common node 104, and the clamp diode 118 is electrically connected in series between the internal circuit node 136 and the second primary input terminal 124-2.

The controllable switch 114 may be variously implemented. Preferably, however, it is implemented using a solid-state switch. Although numerous and varied solid-state switches may be used, such as, for example, an insulated gate bipolar transistor (IGBT) or various other types of transistors, in the depicted embodiment the controllable switch is implemented using a MOSFET (metal-oxide semiconductor field effect transistor). Regardless of how the controllable switch 114 is implemented, it is configured to selectively operate in an ON state and OFF state. In the ON state, current will flow through the controllable switch 114. Conversely, in the OFF state, current will not flow through the controllable switch.

As FIG. 1 further depicts, the circuit 100 additionally includes an output diode 138, an output capacitor 142, a first output node 144, a second output node 146, and a controller 148. The output diode 138 is electrically connected in series between the first secondary terminal 126-1 and the first output node 144, and the output capacitor 142 is electrically connected between the first output node 144 and the second output node 146.

The controller 148 is coupled to the controllable switch 114, and is also coupled to receive a voltage feedback signal and a reference voltage signal, neither of which are illustrated in FIG. 1. The controller 148 is configured, in response to the voltage feedback signal and the reference voltage signal, to command the controllable switch 114, in a well-known manner, to selectively operate in the ON state and the OFF state.

The circuit 100 is preferably used to energize a load 152. The load 152, which may be, for example, a light emitting diode (LED) string, is electrically connected to the first output node 144 and the second output node 146, in a manner that it is electrically connected in parallel with the output capacitor 142. It will be appreciated that the number and type of LEDs included in the LED string may vary, though it will include a plurality of series-connected and/or series/parallel-connected LEDs.

As may be appreciated, when the circuit 100 is operating under steady state conditions (e.g., no switching of the controllable switch 114), the voltage across the circuit inductances (both real and non-ideal) is zero. Thus, the input voltage (Vg) from the electrical power source 122 is split between the first coupling capacitor 112 ($V_{Cc1}$) and second coupling capacitor 116 ($V_{Cc1}$), as illustrated in Equation (1) below:

$$V_g = V_{Cc1} + V_{Cc2}. \qquad \text{(Eq. 1)}$$

And thus, by rearranging Equation (1), the steady state voltage magnitude across the second coupling capacitor 116 is given by Equation (2):

$$V_{Cc2} = V_{Cc1} + V_g. \quad \text{(Eq. 2)}$$

Now, at any switching instant, if the voltage across the controllable switch 114 exceeds the voltage across the second coupling capacitor 116, the clamp diode 118 will be forward biased, thereby clamping the voltage to the instantaneous voltage across the second coupling capacitor 116 ($V_{Cc2}(t)$). The peak value of the voltage during this period can be expressed as follows, (for n=1, and where $V_{Lm}$ is the voltage across the magnetizing inductance 134):

$$V_{Cc1} = V_{Lm} = V. \quad \text{(Eq. 3)}$$

From Equations (2) and (3), it can be seen that:

$$V_{Cc2} = V + V_g. \quad \text{(Eq. 4)}$$

Thus, from Equation (4) it is evident that the peak voltage across the second coupling capacitor 116, and thus the voltage across the controllable switch 114, will not exceed the sum of the instantaneous input (V) and output ($V_g$) voltage magnitudes. This is irrespective of the magnitudes of the non-ideal inductances of the isolation transformer.

Figure 2:
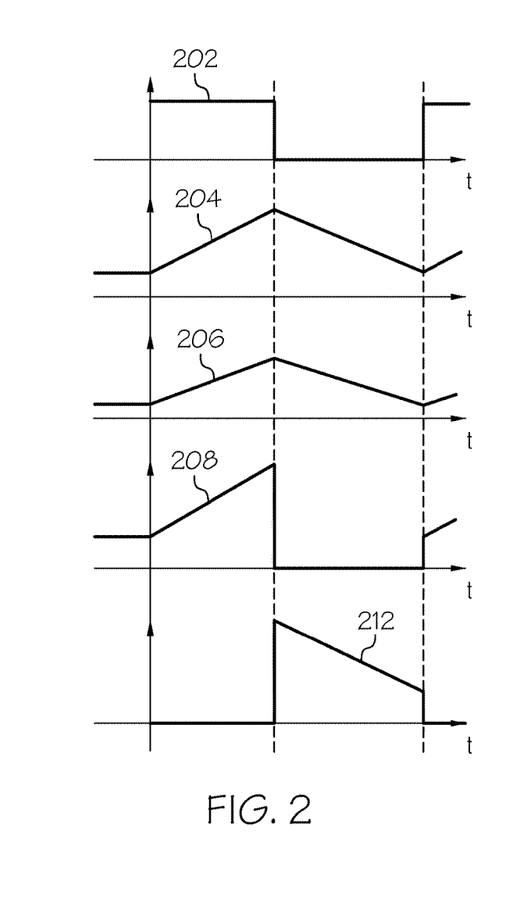
FIGS. 2 and 3 graphs of current through various circuit elements of the SEPIC circuit of FIG. 1.
Figure 3:
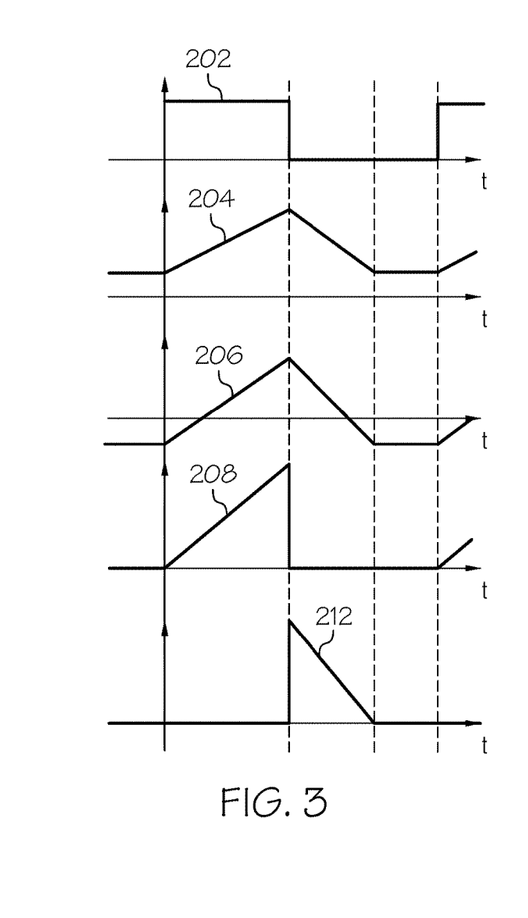

The current through various circuit elements of circuit 100 during a switching cycle are depicted in FIGS. 2 and 3. Specifically, the currents depicted in FIG. 2 result from the circuit 100 being operated in a continuous conduction mode (CCM), and the currents depicted in FIG. 3 result from the circuit 100 being operated in a discontinuous conduction mode (DCM). The operation of the circuit 100 in each of these operating modes will be briefly described, beginning first with the CCM. In doing so, it should be noted that the parenthetical references refer to the like numbered graphical representations in FIGS. 2 and 3.

As FIG. 2 depicts, when the controllable switch 114 is in the ON state (202), energy is being stored in the inductor 108 from the electrical power source 122, and in the primary of the isolation transformer from the first and second coupling capacitors 112, 116. The current through the controllable switch 114 (208) during this interval of operation is the sum of the currents through the inductor 108 (204) and the magnetizing inductance 134 (206). Because the net current seen by the primary of the transformer 106 is zero, the output diode 138 is reverse biased, and the current flow through the output diode 138 (212) is zero.

When the controllable switch 114 is transitioned to the OFF state (202), the inductor 108 and the magnetizing inductance 134 demagnetize, and the sum of the currents (204, 206) is transferred through the transformer 106 to the output diode 138. However, before the output diode 138 is forward biased, due to the transformer leakage inductances 128, 132, a relatively large voltage spike (as previously described) is developed across the controllable switch 114. When this voltage exceeds the voltage on the second coupling capacitor 116, the clamp diode 118 is forward biased and starts conducting, limiting the voltage across the controllable switch 114, as noted above, to $V_{Cc2}$. The current through the controllable switch 114 (208) at this instant is zero. As soon as the voltage spike settles down, the clamp diode 118 is reverse biased. When the output diode 138 is forward biased, the sum of the currents (204, 206) flows through the output diode 138 to the load 152.

Turning now to FIG. 3, it is noted that behavior of the circuit 100 in DCM is similar to that of CCM during the period when the controllable switch 114 is in the ON state and the output diode 138 is forward biased. But, unlike in CCM, the DCM has an additional operating mode referred to as the "freewheeling mode," in which both the controllable switch 114 and the output diode 138 are in the OFF state. When the controllable switch 114 is transitioned to the OFF state (202), stored energy starts transferring to the load 152 and demagnetizes the inductor 108 and the magnetizing inductance 134. When the currents through these elements (202, 204) are equal in magnitude (but opposite in sign), the net current through the transformer primary 124 becomes zero, reverse biasing the output diode 138. The freewheeling mode starts from this point onward.

During this interval, the input energy is shared between the first and second coupling capacitors 112, 116, and the currents through the inductor 108 (204) and the magnetizing inductance 134 (206) are steady, and are equal in magnitude and opposite in sign. In a steady state condition, the average voltage seen by the controllable switch 114 during this interval is the magnitude of the input voltage 122 ($V_g$). Similar to a conventional isolated SEPIC, the voltage across the controllable switch 114 oscillates with an average of this voltage during freewheeling mode interval. However, unlike the conventional SEPIC, the frequency of oscillations is controlled by the inherent LC tank formed by the magnetizing inductance 134, the first and second coupling capacitors 112, 116, and the capacitance (e.g., drain-to-source capacitance) of the controllable switch 114.

Figure 4:
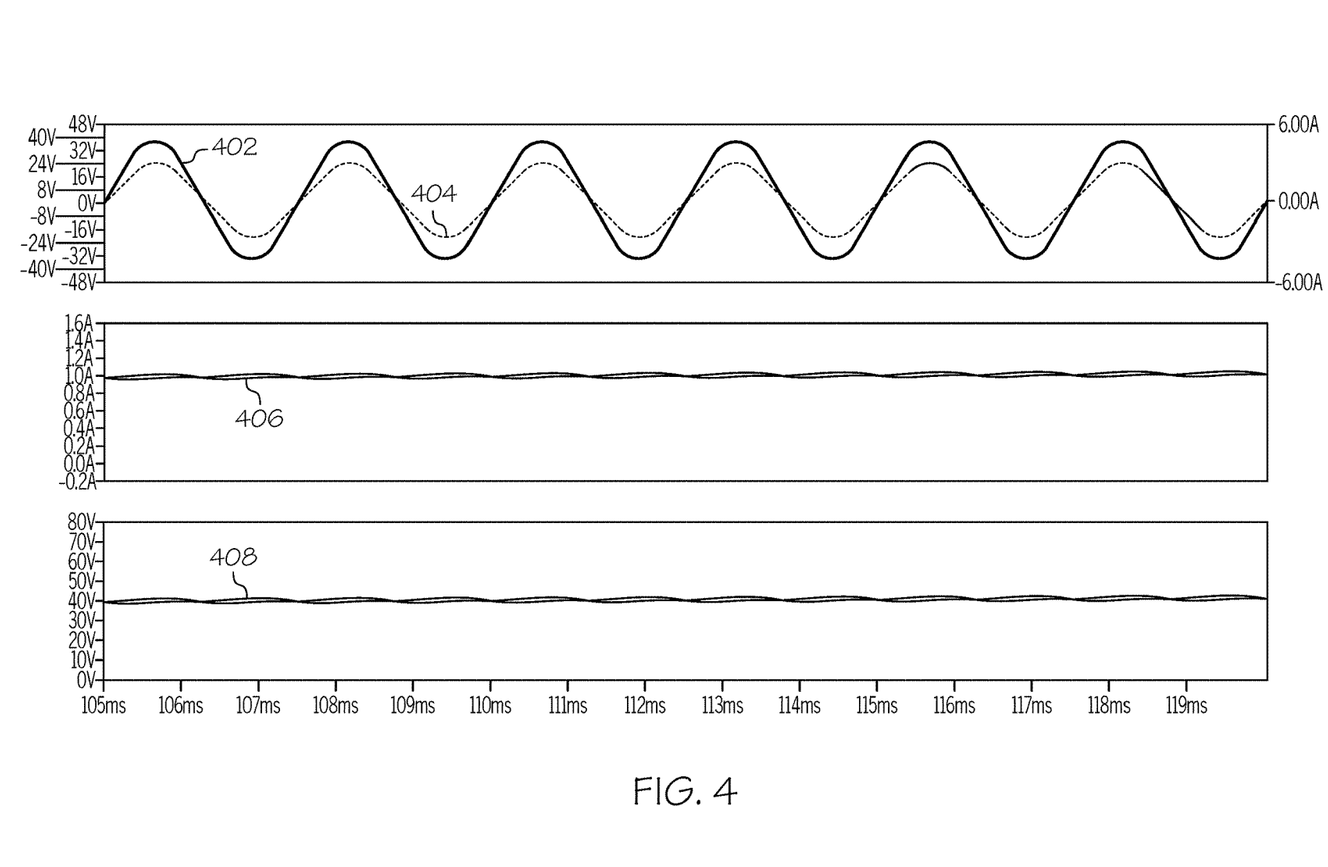
FIGS. 4 and 5 depict various simulation results of the SEPIC circuit of FIG. 1.
Figure 5:
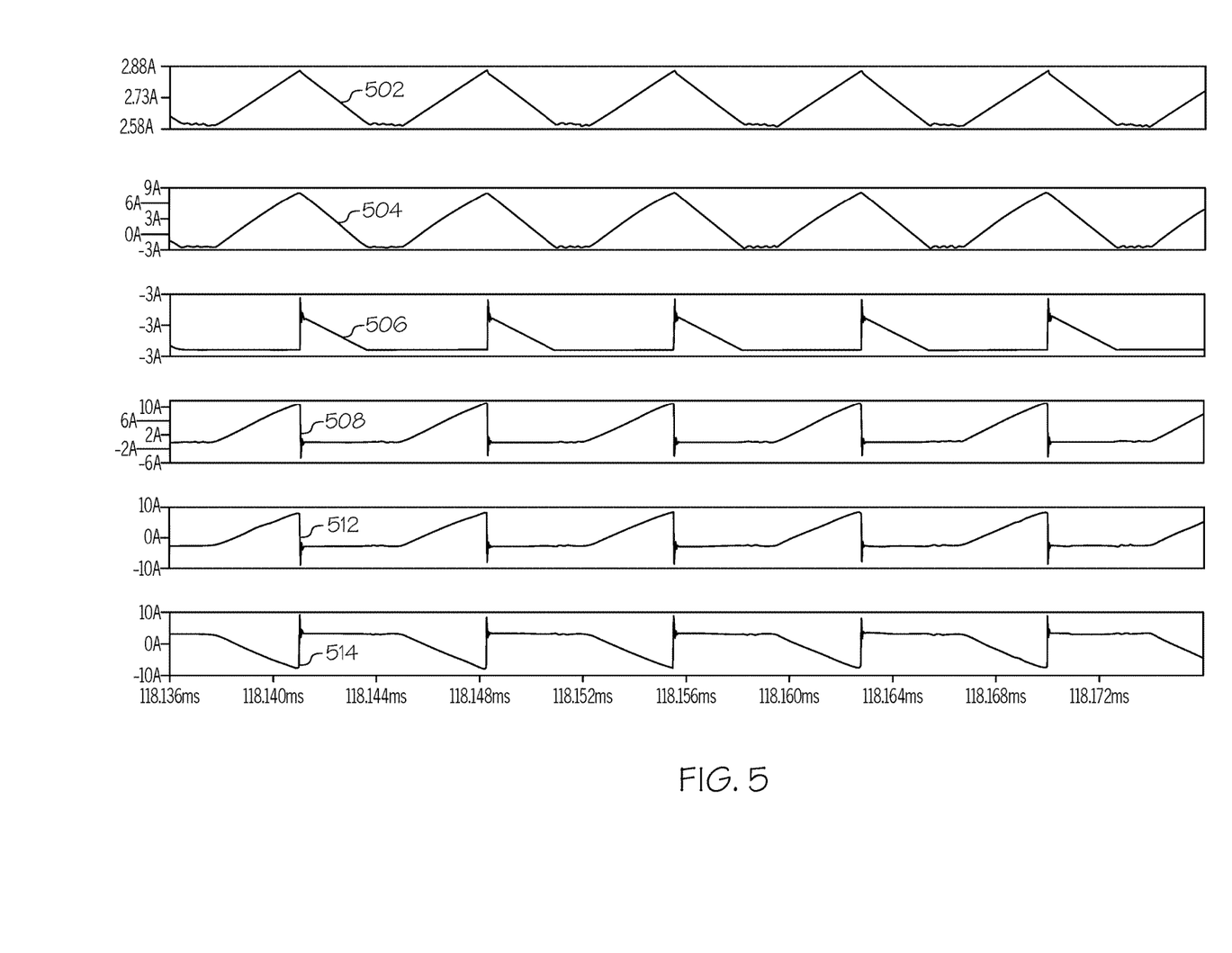

A simulation model of the circuit 100 was built, and simulation results for the circuit 100 were generated. These results are depicted in FIGS. 4-9, and are based on the following parameters, while operating the circuit 100 in DCM:

Input Voltage: 28
Input Frequency: 400 Hz
LED String Current: 1 A
No. of LEDs: 13 (string voltage of 40V)
Leakage Inductance: 0.34 µH The simulation results depicted in FIG. 4 include the input voltage (402), the input current (404), the load current (406), and the load voltage (408). The simulation results depicted in FIG. 5 include current through the inductor 108 (502), current through the magnetizing inductance 134 (504), current through the output diode 138 (506), current through the controllable switch 114 (508), current through the first coupling capacitor 112 (512), and current through the second coupling capacitor 116 (514).

Figure 6:
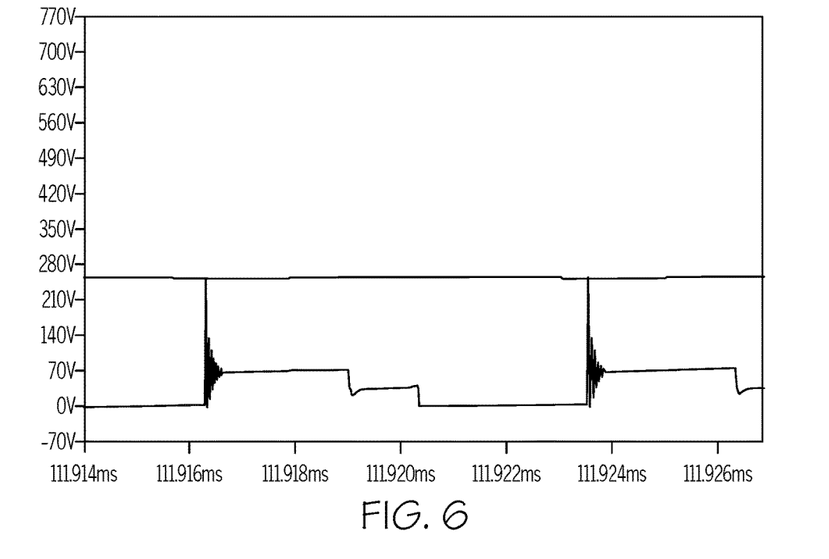
FIGS. 6-9 graphically depict comparisons of a conventional SEPIC circuit with the SEPIC circuit of FIG. 1.
Figure 7:
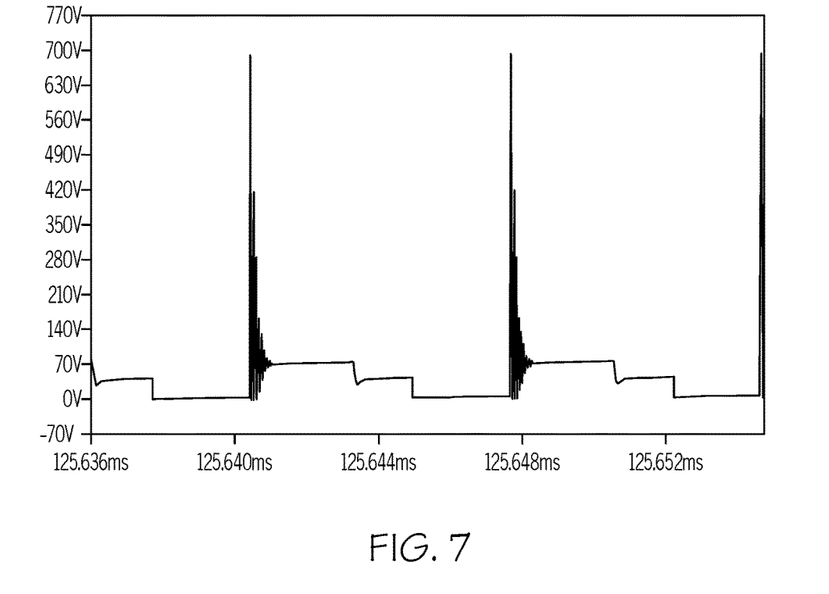
Figure 8:
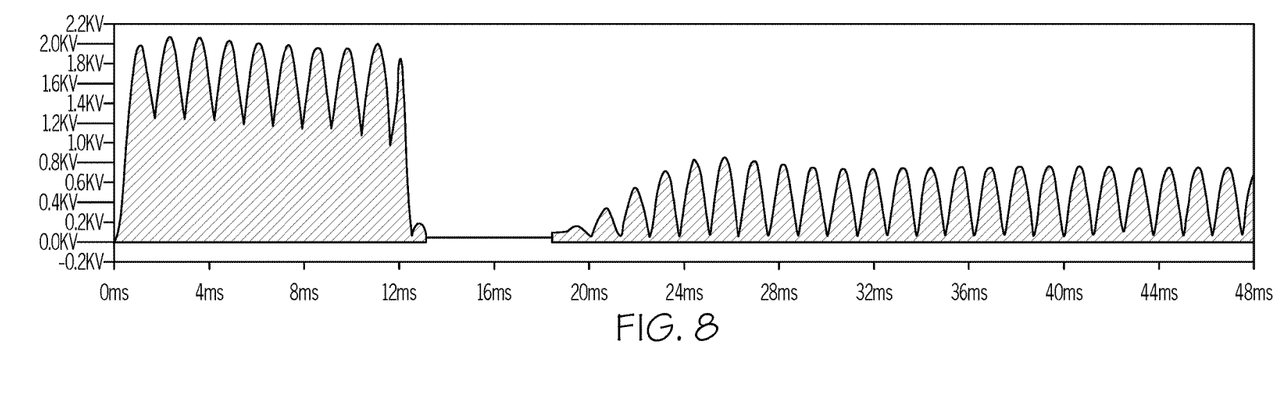
Figure 9:
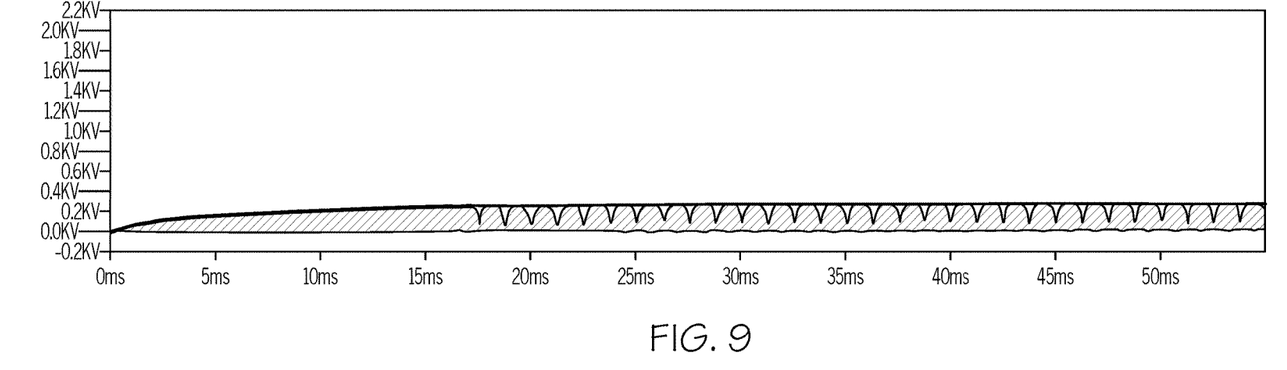

Significantly, and as FIGS. 6 and 7 depict, the peak voltage spike generated due to the transformer leakage inductances 128, 132 in steady state is clamped to 250V in the circuit 100, as compared to approximately 700V in a conventional SEPIC. Moreover, as FIGS. 8 and 9 depict, the voltage profile of the controllable switch 114 during the transient response of the circuit 100 results in less stressing as compared to the convention SEPIC. In particular, the controllable switch 114 in the conventional SEPIC (FIG. 9) is subjected to a peak voltage stress of about 2 kV, whereas the voltage is clamped to a relatively low voltage in the current circuit 100. This reduced voltage stress during switch transitions enables users to use a lower voltage rated controllable switch 114, which in turn exhibits a relatively lower on-state resistance ($R_{DS(on)}$). A low on-state resistance reduces conduction losses and the reduced peak voltage also reduces the switching loss during turn-off transitions. Hence, with the proposed circuit, low conduction and reduced turn-off losses enhance circuit 100 efficiency.

The isolated SEPIC circuit 100 disclosed herein does not generate undesirably large voltage spikes during switching operations, provides improved circuit reliability and efficiency, and does not generate undesirable electromagnetic interference (EMI).

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language.

As used herein, when the phrase "coupled to" is used in describing a relationship between different elements, this phrase does not imply that a direct physical connection must be made between these elements. For example, two elements may be coupled to each other physically, electronically, logically, or in any other manner, through one or more additional elements. However, when the phrase "electrically connected to" is used in describing a relationship between different elements, this phrase does imply a direct physical connection between these elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A single-ended primary-inductor converter (SEPIC) circuit having at least a circuit input node and a circuit common node, the converter circuit comprising:
   an inductor;
   a first coupling capacitor;
   an isolation transformer having transformer primary and a transformer secondary, the transformer primary having a first primary terminal and a second primary terminal, the transformer secondary having a first secondary terminal and a second secondary terminal;
   a controllable switch;
   a second coupling capacitor; and
   a clamp diode,
   wherein:
       the inductor is electrically connected in series between the circuit input node and the first coupling capacitor,
       the first coupling capacitor is electrically connected in series between the inductor and the first primary input terminal,
       the controllable switch is electrically connected in series between an internal circuit node and the circuit common node, the internal circuit node located between the inductor and the first coupling capacitor,
       the second coupling capacitor is electrically connected in series between the second primary input terminal and the circuit common node,
       the clamp diode is electrically connected in series between the internal circuit node and the second primary input terminal, and
       electrically connected defines a direct physical connection.

2. The SEPIC circuit of claim 1, wherein the controllable switch is configured to selectively operate in an ON state, in which current will flow through the controllable switch, and an OFF state, in which current will not flow through the controllable switch.

3. The SEPIC circuit of claim 2, further comprising:
   a controller coupled to the controllable switch and configured to command the controllable switch to selectively operate in the ON state and the OFF state.

4. The SEPIC circuit of claim 1, further comprising:
   a first output node;
   a second output node; and
   an output diode,
   wherein:
       the output diode is electrically connected between the first secondary terminal and the first output node, and
       the second output node is electrically connected to the second secondary terminal.

5. The SEPIC circuit of claim 4, further comprising:
   an output capacitor electrically connected between the first output node and the second output node.

6. The SEPIC circuit of claim 5, further comprising:
   a load electrically connected in parallel with the output capacitor.

7. The SEPIC circuit of claim 6, wherein the load comprises a string of light emitting diodes (LEDs).

8. The SEPIC circuit of claim 1, wherein the controllable switch is a solid-state switch.

9. The SEPIC circuit of claim 8, wherein the solid-state switch is a MOSFET.

10. The SEPIC circuit of claim 8, wherein the controllable solid-state switch is a MOSFET.

11. A single-ended primary-inductor converter (SEPIC) circuit having at least a circuit input node, a circuit common node, a first output node, and a second output node, the converter circuit comprising:
    an inductor;
    a first coupling capacitor;
    an isolation transformer having transformer primary and a transformer secondary, the transformer primary having a first primary terminal and a second primary terminal, the transformer secondary having a first secondary terminal and a second secondary terminal;
    a controllable solid-state switch;
    a second coupling capacitor;
    a clamp diode; and
    an output diode,
    wherein:
        the inductor is electrically connected in series between the circuit input node and the first coupling capacitor,
        the first coupling capacitor is electrically connected in series between the inductor and the first primary input terminal,
        the controllable solid-state switch is electrically connected in series between an internal circuit node and the circuit common node, the internal circuit node located between the inductor and the first coupling capacitor,
        the second coupling capacitor is electrically connected in series between the second primary input terminal and the circuit common node,
        the clamp diode is electrically connected in series between the internal circuit node and the second primary input terminal,
        the output diode is electrically connected between the first secondary terminal and the first output node, the second output node is electrically connected to the second secondary terminal, and electrically connected defines a direct physical connection.

12. The SEPIC circuit of claim 11, wherein the controllable solid-state switch is configured to selectively operate in an ON state, in which current will flow through the controllable solid-state switch, and an OFF state, in which current will not flow through the controllable solid-state switch.

13. The SEPIC circuit of claim 12, further comprising:
a controller coupled to the controllable solid-state switch and configured to command the controllable solid-state switch to selectively operate in the ON state and the OFF state.

14. The SEPIC circuit of claim 11, further comprising:
an output capacitor electrically connected between the first output node and the second output node.

15. The SEPIC circuit of claim 14, further comprising:
a load electrically connected in parallel with the output capacitor.

16. The SEPIC circuit of claim 15, wherein the load comprises a string of light emitting diodes (LEDs).

17. A single-ended primary-inductor converter (SEPIC) circuit having at least a circuit input node, a circuit common node, a first output node, and a second output node, the converter circuit comprising:
an inductor;
a first coupling capacitor;
an isolation transformer having transformer primary and a transformer secondary, the transformer primary having a first primary terminal and a second primary terminal, the transformer secondary having a first secondary terminal and a second secondary terminal;
a controllable solid-state switch;
a second coupling capacitor;
a clamp diode;
an output diode;
an output capacitor; and
a string of light emitting diodes (LEDs), wherein:
the inductor is electrically connected in series between the circuit input node and the first coupling capacitor,
the first coupling capacitor is electrically connected in series between the inductor and the first primary input terminal,
the controllable solid-state switch is electrically connected in series between an internal circuit node and the circuit common node, the internal circuit node located between the inductor and the first coupling capacitor,
the second coupling capacitor is electrically connected in series between the second primary input terminal and the circuit common node,
the clamp diode is electrically connected in series between the internal circuit node and the second primary input terminal,
the output diode is electrically connected between the first secondary terminal and the first output node,
the output capacitor is electrically connected to the first output node, the second output node, and the second secondary terminal,
the string of LEDs is electrically connected in parallel with the output capacitor, and
electrically connected defines a direct physical connection.

18. The SEPIC circuit of claim 17, wherein the controllable solid-state switch is configured to selectively operate in an ON state, in which current will flow through the controllable solid-state switch, and an OFF state, in which current will not flow through the controllable solid-state switch.

19. The SEPIC circuit of claim 18, further comprising:
a controller coupled to the controllable solid-state switch and configured to command the controllable solid-state switch to selectively operate in the ON state and the OFF state.

20. The SEPIC circuit of claim 17, wherein the controllable solid-state switch is a MOSFET.

* * * * *